United States Patent

[11] 3,602,796

[72] Inventor Johannes Hartmut Bieher
Fishkill, N.Y.
[21] Appl. No. 820,738
[22] Filed May 1, 1969
[45] Patented Aug. 31, 1971
[73] Assignee Robert Bosch GmbH
Stuttgart, Germany
[32] Priority May 10, 1968
[33] Germany
[31] P 17 63 349.7

[54] TRANSISTORIZED VOLTAGE REGULATOR, PARTICULARLY FOR AUTOMOTIVE USE
15 Claims, 4 Drawing Figs.

[52] U.S. Cl. .................................................. 322/28,
322/33, 322/73, 323/22 T
[51] Int. Cl. ...................................................... H02p 9/30
[50] Field of Search ........................................... 322/22, 23,
28, 33, 73; 323/22 T, 22 SC

[56] References Cited
UNITED STATES PATENTS

| | | | |
|---|---|---|---|
| 3,056,913 | 10/1962 | Henderson et al. | 322/73 X |
| 3,179,874 | 4/1965 | Guennou | 322/28 X |
| 3,209,236 | 9/1965 | Bridgeman | 322/73 X |
| 3,443,200 | 5/1969 | Kuhn | 322/28 X |
| 3,471,769 | 10/1969 | Roesel, Jr. | 322/28 |

Primary Examiner—Oris L. Rader
Assistant Examiner—H. Huberfeld
Attorney—Flynn & Frishauf ABSTRACT: The output voltage of an automotive generator is rectified and applied to a bridge network, the cross connection from the bridge being connected to an amplifier with a differential input stage. The output of the amplifier controls current through the field winding of the alternator. Each of the branches of the bridge contains temperature-sensitive and voltage-sensitive nonlinear elements connected in opposition, so that upon deviation from the exact output voltage desired, the potential across the cross connection will change rapidly and exact voltage control can be obtained.

TRANSISTORIZED VOLTAGE REGULATOR, PARTICULARLY FOR AUTOMOTIVE USE

The present invention relates to semiconductor-type voltage regulators, and more particularly to transistorized voltage regulators for automotive-type three-phase alternators, in which the voltage regulator has a transistor controlling the current through the field winding of the alternator.

Various types of transistorized voltage regulators have been proposed in which the output voltage of the alternator is maintained substantially constant around a median value. The output of the alternator constantly varies by a small amount about a median, or average value. When the voltage to be regulated exceeds a predetermined value, current to the field winding is interrupted; and when the voltage drops below a predetermined value, current is supplied to again raise the value of the output voltage. Semiconductors used in such a voltage regulator are preferably controlled in such a manner that they operate as semiconductor switches, that is that they are either fully conductive or completely blocked, thus decreasing losses in the voltage regulator, and simplifying cooling problems as well as enabling the use of semiconductors of lower rating. The voltage regulator additionally should be sensitive and respond already upon small deviations from the desired value of the voltage, so that the control transistor for the field is switched on, or off promptly upon deviation of the voltage from the desired level.

Voltage regulators of this type utilize a voltage-sensitive device which provides a control quantity which is nonlinear with respect to the voltage to be regulated, so that any change of output voltage from the desired value provides a substantial, amplified effect to enable high speed of response.

It has been proposed to provide additional sensing coils in the alternator in order to supply a nonlinear voltage divider in the regulator (see German Pat. No. 1,095,924); another form of transistorized voltage regulator is described in German Pat. No. 1,053,628 which, however, is not suitable for use with integrated circuits.

It is an object of the present invention to provide a voltage regulator, and more particularly a voltage sensing and amplifying arrangement which is sensitive to small variations and additionally particularly suitable for construction as an integrated circuit especially a monolithic integrated circuit.

SUBJECT MATTER OF THE PRESENT INVENTION

Briefly, a differential amplifier is utilized, having its two inputs connected across bridge-type voltage dividers which act as output voltage sensing elements. Each of the branches of the bridge-type voltage divider includes nonlinear elements, responsive to changes in ambient temperature and to voltage above, or below a predetermined amount. The output of the differential amplifier is then applied to control the control transistor for the field winding. A cross coupling in the form of a feedback circuit is provided so that the output transistor will switch abruptly from fully conductive to fully blocked state.

The advantageous properties of a differential amplifier may be lost if its output is not symmetrically loaded; in order to utilize the sensitivity of differential amplifiers to minor changes between inputs, a preamplifier is located between the output of the differential amplifier and the control transistor which includes a pair of symmetrical inputs separately coupled to the two outputs of the differential amplifier.

It has been found that the inductivity of the field winding of the alternator, together with the capacity of the winding and capacitances in the switching network may form an oscillatory circuit leading to spurious oscillations. These spurious oscillations may become excessive and rise to high values, resulting in destruction of semiconductor elements included in the circuit. Such oscillations are readily suppressed by utilizing, at best in the preamplifier, one transistor having very low frequency cut off.

The invention will be described by way of example with reference to the accompanying drawings, wherein.

Figure 1:
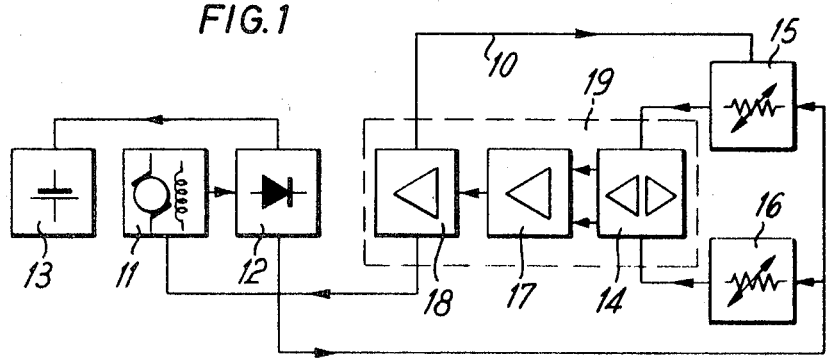
FIG. 1 is a schematic block diagram of the voltage regulator.

A three-phase generator 11 is connected to a bridge-type rectifier 12, which is arranged to charge a battery 13. A pair of voltage dividers 15, 16 are connected to the bridge-type rectifier 12, the tap points of the voltage divider pair being connected to the inputs of a differential amplifier 14, having a pair of outputs. The outputs are symmetrically connected to the inputs of a preamplifier 17, which controls a power amplifier and switching network 18 which directly controls the current through the field winding of generator 11. A cross coupling, feedback line 10 from unit 18 back to one of the voltage dividers, in the example of FIG. 1 to voltage divider 15, ensures rapid and positive switching of the switching element in unit 18 from on to off state. The differential amplifier 14, preamplifier 17 and the amplifier in switching unit 18 together form an amplifier element 19.

Figure 2:
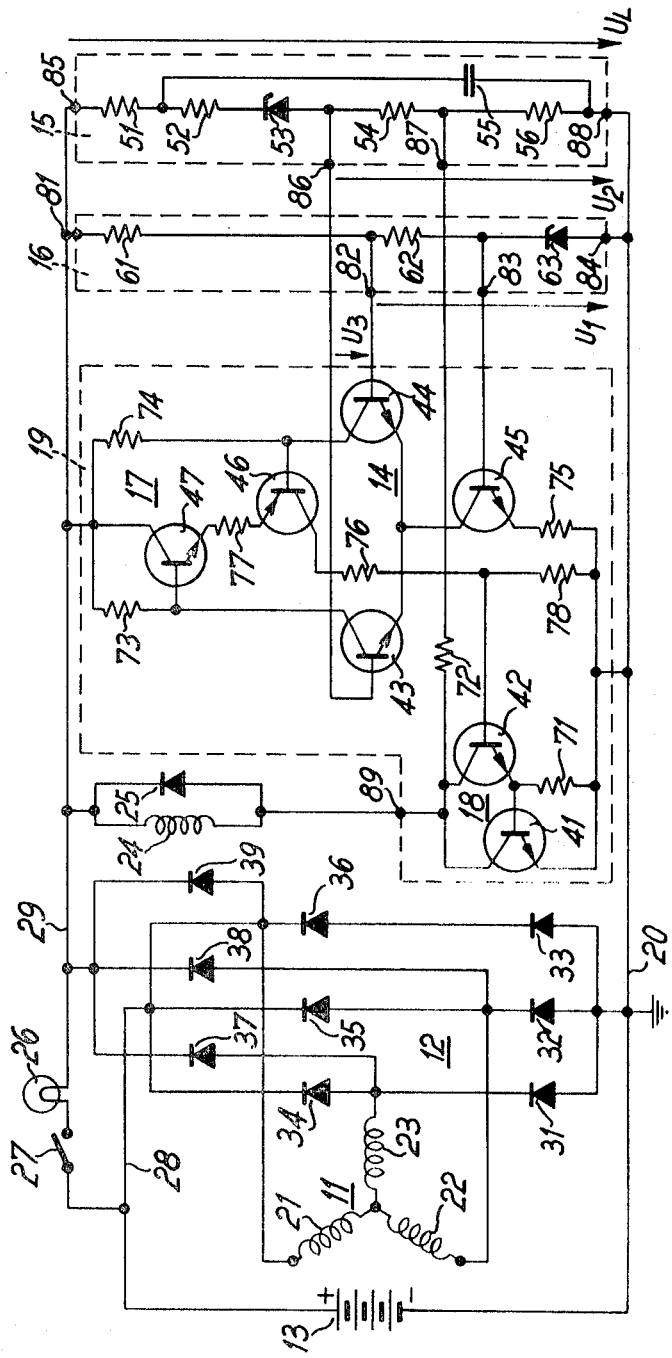
FIG. 2 is a schematic diagram of the regulator.

Referring to FIG. 2: Three armature windings 21, 22, 23 of generator 11 are star-connected and supply rectifier 12 including diodes 31 to 33 and 34 to 36, to provide direct current output at a positive bus 28 and a negative, or chassis bus 20. Diode elements 31 to 36 are connected as a three-phase bridge rectifier. Battery 13 is connected between buses 20, 28.

Three additional rectifier units 37, 38, 39 are further connected to armature windings 21, 22, 23 to provide a second positive output bus 29. Buses 28 and 29 are interconnected by a series circuit of ignition switch 27 and a charge control lamp 26.

Generator 11 is provided with a field winding 24, to which a floating diode is connected in parallel. Field winding 24, and its diode 25 is connected to bus 29 on the one side, and to a terminal 89 of the voltage regulator on the other. The collector of an NPN switching transistor 41 is connected in series between terminal 89 and bus 20. A transistor 42, its collector likewise connected to terminal 89, has its emitter connected to the base of transistor 41 and over a resistance 71 likewise to chassis at 20. The transistor 42, likewise an NPN transistor acts as a driver for transistor 41. Its base is connected over resistance 78 to chassis bus 20. Additionally, the base of transistor 42 is connected over a resistance 76 to the collector of a PNP transistor 46, the emitter of which is connected over resistance 77 to the emitter of an NPN transistor 47. The collector of NPN transistor 47 is connected to positive bus 29. The base of transistor 46 is connected on the one hand over a resistance 74 to the positive bus 29 and on the other to the collector of a transistor 44, which forms part of the differential amplifier. The base of NPN transistor 47 is also connected over a resistance 73 to the bus 29 and further to the collector of a second NPN transistor 43 of the differential amplifier. The two emitters of the differential amplifier transistors 43, 44 are interconnected and are directly supplied by the collector of an NPN transistor 45, serving as a constant current source. The emitter of transistor 45 is connected over resistance 75 to negative bus 20.

A pair of voltage dividers, forming a bridge network, are connected between buses 29 and 20 at terminals 81, 84 and 85, 88, respectively. Terminal 84 of voltage divider 16 is connected to the anode of a reference Zener diode 63, the cathode of which connects to a junction 83, which is connected to the base of the transistor 45, which is a constant current source. Junction 83 is connected over a resistance 62 to a cross connection or tap point junction 82 of the voltage divider; junction 82 is connected to the base of transistor 44 of the differential amplifier. A resistance 61 connects between junction 82 and junction 81, connected to the bus 29.

The second voltage divider 15 has its connection point 85 connected to positive bus 29. A filter resistance 51 is connected at junction point 85, the other end of which connects with a filter condenser 55 connected at junction 88 and to chassis bus 20. Resistance 51 is further connected to a resistance 52, the other terminal of which connects to a cathode of a reference Zener diode 53. The anode of reference diode 53 is connected over a tap point forming a cross connection illustrated at junction 86 with the base of transistor 43 of the differential amplifier. Additionally, it connects with a resistance 54. The other end of resistance 54 connects to a junction point 87 and over a resistance 56 back to terminal 88 connected to chassis bus 20. A feedback resistance 72 interconnects between junction 87 of the voltage divider 15 and terminal 89 of the voltage regulator network.

Figure 3:
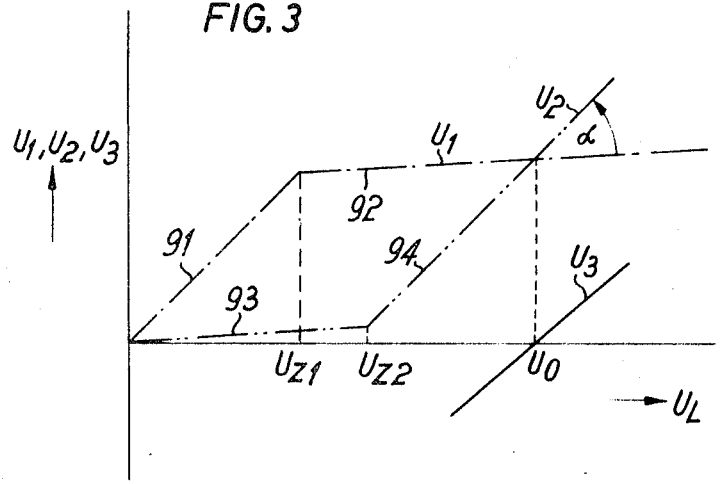
FIG. 3 illustrates various voltages, with respect to output voltages arising within the regulator.

The voltages at the junction points 86 and 82 of the voltage dividers 15, 16 are illustrated in FIG. 3. Graph $U_1$ schematically and approximately illustrates the potential distribution at point 82 in dependence on the value of the voltage $U_1$ occurring between buses 29 and 20; graph $U_2$ illustrates the voltage, approximately and in schematic form, at point 86 (with respect to bus 20). Graph $U_3$ illustrates the difference between the voltages $U_2$ and $U_1$.

As the voltage $U_L$ increases from a value of zero, voltage $U_1$ at point 82 of voltage divider 16 increases similarly, as illustrated by the portion of the graph 91 (currents flowing from junctions 82 and 83 of the voltage divider 16 are here neglected). Voltage $U_1$ increases until the breakdown value $U_{Z1}$ of reference diode 63 is reached. As $U_L$ increases, the value of $U_1$, as illustrated by the portion of the graph at 92 remains essentially constant. The voltage distribution at junction 86 of voltage divider 16 has a different characteristic. At low values of $U_L$, reference diode 53 is blocked, so that voltage $U_2$ essentially has the value of zero. The voltage $U_2$, then, as illustrated in portion of the graph 93, is almost horizontal. When $U_L$ reaches the breakdown potential $U_{Z2}$ of reference diode 53, voltage $U_2$ increases, as illustrated in the portion of the graph at 94, essentially directly in proportion (with a factor of one) with the voltage $U_L$. The portions of the graphs 92 and 94 will include the angle $\alpha$.

The operation of the regulator in accordance with FIG. 2 can best be explained in connection with its action on the generator 11.

The rotating field of generator 11 is coupled with an internal combustion engine, for example an automotive vehicle engine now shown. Upon starting of the engine, ignition switch 27 is closed. At low speed of the engine, armature windings 21, 22, 23 generate hardly any voltage so that current will flow from the positive terminal of battery 13 over the ignition switch and the ignition control lamp 26 (which will light) through field windings 24 and transistor 21 which is conductive, and back to the chassis bus 20 and to the battery. Field current within field winding 24, and rotation of the alternator will create a potential which is rectified in rectifier unit 12, so that the voltage between lines 28 and 20, and between 29 and 20 will rapidly increase. When the alternator has reached sufficient speed, rectifiers 37, 38, 39 will, themselves, supply sufficient field current so that the charge control lamp 26 will extinguish. Battery 13 will be charged over rectifier units 31 to 36, and additional loads can be supplied from the generator.

The self-excitation causes further increase in the voltage of the generator. When a certain predetermined maximum value is reached, amplifier 19 will cause turnoff of driver transistor 42 and control transistor 41. Field current can no longer flow to the chassis bus 20 of the generator, and will continue, due to the inductivity of the field winding, to flow over floating diode 25. Due to the inherent resistance of field winding 24, the current through windings 24 and diode 25 will decrease, however, causing a lower voltage to be generated in the armature windings 21, 22, 23 and the charging voltage will decrease. When a certain minimum value is reached, transistor 41 will again become conductive, current will again flow through field winding 24 and the output voltage of the generator $U_L$ will again increase. This cycle will continuously repeat at a frequency of from between 50 to 200 Hz.

Control of the conduction of transistor 41 is obtained by the amplifier and control circuit of the voltage regulator. The voltage divider pair 15, 16, has a pair of nonlinear elements, namely reference diodes 53, 63. Voltage $U_1$ between junctions 82 and 84 of branch 16 is, as clearly seen in FIG. 3, a nonlinear function of the output voltage $U_L$ appearing between points 81 and 84; voltage $U_2$ of the voltage divider branch 15 is a nonlinear function of the same output voltage $U_L$, which is also connected to points points 85, 88.

Let it be assumed that initially the voltage $U_L$, to be regulated, is too low. Reference diode 53 in branch 15 is nonconductive and the voltage at point 86 (corresponding to the portion of graph illustrated at 93 in FIG. 3) is almost zero. Transistor 43 in differential amplifier 17 is blocked. The voltage at point essentially of the voltage divider branch 16 is, however, essentially the same as the value at junction 81, since reference diode 63 is likewise nonconductive. Differential amplifier transistor 44 is therefore conductive. Current will flow over resistance 74 and the voltage across resistance 74 will cause the two transistors 46 and 47 to become conductive, since the base of transistor 47 is connected over resistance 73 essentially to the voltage of line 29. Current will flow through resistances 76 and 78. The voltage across resistance 78 will cause driver transistor 42, and it in turn switching transistor 41 to be conductive.

When transistor 41 becomes conductive, excitation current will flow through the field winding and output potential $U_L$ will increase. As soon as the output voltage $U_L$ reaches the value $U_{Z1}$, the voltage at junction 83 will remain constant and the source of continuous, constant current that is transistor 45, will be in normal operating condition. The voltage at junction 86 will continue to remain almost zero. Transistor 43 will remain blocked, as before, and current will flow through the preamplifier transistor stages 46, 47, which retains transistor switch 41 in the ON condition. When the voltage $U_L$, however, exceeds the value $U_{Z2}$, voltage at junction 86 will increase in accordance with the portion of the graph 94, FIG. 3. Voltage $U_2$ will be small in relation to the voltage $U_1$, the difference voltage $U_3$ will be highly negative and semiconductor switch 41, 42 will continue conductive. Due to the voltage drop across resistance 62, voltage $U_1$, however, increases slightly.

As soon as output voltage $U_L$ has reached the value $U_0$ (FIG. 3), the two voltages $U_1$ and $U_2$ will be equal. Difference voltage $U_3$ will be zero. Both differential amplifier transistors 43 and 44 will be conductive. The bases of the transistors 46, 47 will have the same potential since their emitters are interconnected. Both are therefore nonconductive. No base current will flow through resistance 76 to driver transistor 42 and switching transistor 41 will become nonconductive, disconnecting excitation current. In actual operation, the turnoff will be initiated just in advance of output voltage $U_L$ reaching the value $U_0$, since the transistors 46, 47 as well as all other transistors require a certain minimum base-emitter voltage in order to carry collector current.

Feedback resistance 72 was, in effect parallel to the resistance 56 which forms a portion of the voltage divider 15 during such time as semiconductor switch 41, 42 was conductive. One end of resistance 72, in effect, was at zero potential. As soon as the semiconductor switch becomes nonconductive, however, the end of resistance 72 is, in effect, connected over the diode 25 and field winding 24 to the voltage $U_L$ which is to be regulated. The voltage at junction point 87, and with it the voltage $U_2$ is further increased over the feedback resistance 72 when the switching-off condition occurs. This cross coupling resistance thus substantially increases the switching speed. Resistance 72 could also be connected to junction 86 and thus directly to an input of the differential amplifier. It is, however, usually preferred to connect the resistance 72 to a tap point between junctions 86 and 88, as shown, that is to form a tap between resistances 54, 56 of voltage divider 15.

As soon as semiconductor switch 41, 42 becomes nonconductive, the excitation current will decrease as above described. Output voltage $U_L$ will drop until the value of voltage $U_2$ will be so much below the value of voltage $U_1$ that the differential amplifier transistor 43 does not receive sufficient collection current in order to hold transistors 46, 47 in blocked condition. Current through resistance 76 connected to the base of driver transistor 72 will thus cause closing of semiconductor switch 41, that is conduction of the transistor 41, and current can again flow from the main supply through the field winding 24. Feedback resistance 72, also in the switching-on mode, increases the switchover speed. As soon as transistors 41, 42 become conductive, resistance 72 is placed, in effect, at the left side (FIG. 2) from the position bus 29 to the negative bus 20, which assists in the decrease of the voltage $U_2$, and thus the increase in the base current of the driver transistor 42. Voltage $U_L$, as soon as field current flows, will again increase and the regulator cycle will continue.

Field winding 24 has a substantial number of turns so that the entire field will have a certain and quite measurable inductive reactance. Additionally, the various turns on the field windings, with respect to each other, will have a certain capacity which may rise to a substantial, measurable value when distributed over the entire field 24. The connections from the field 24 to junction 89 of amplifier 19 will also have capacity. All capacities within the circuit, and additional stray capacities may form, together with the inductivity of field winding 24 a circuit which is subject to spurious oscillations.

The voltage regulator, in its regulating action, is a two-state regulating circuit having an operating frequency which may vary between 20 and 500 Hz., although the range may be less. The regulator has a plurality of transistor stages, each having a high degree of amplification, so that spurious oscillations may occur in the entire regulating network, and particularly in the time in which the semiconductor switch 41, 42 changes between conductive and nonconductive states. The frequency is determined by the inductive and capacitive reactance, as described, formed by the inductivity of the field together with the network and inherent capacities. It has been found that, in actual operation, the values of inductive and capacitive reactance may be so distributed that the frequency of the possible oscillations is high with respect to the normal operating cycling frequency.

According to a feature of the invention, such spurious oscillations are suppressed by using a semiconductor amplifier element 46 which is so constructed that it is strongly frequency dependent, and particularly such that its amplification factor drops sharply at higher frequencies.

Figure 4:
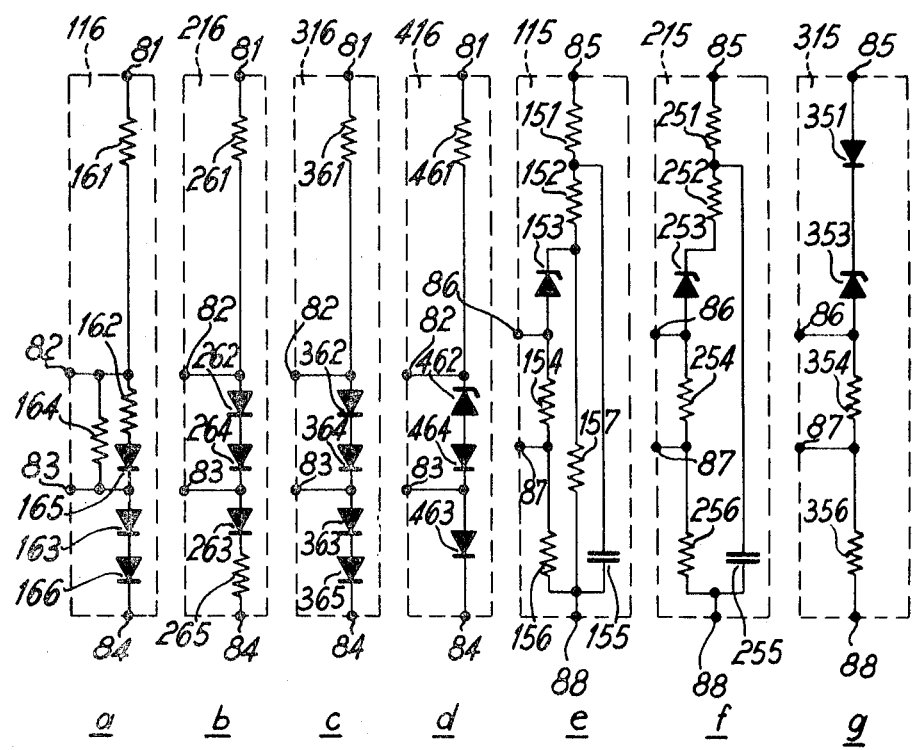
FIG. 4 illustrates in sections a to g various forms of voltage dividers useful in the circuit of FIG. 2.

FIG. 4 illustrates various examples of particularly advantageous constructions for the voltage divider pairs 15, 16. The accuracy with which the output voltage $U_L$ can be maintained at a predetermined value depends on the angle $\alpha$ between the portions of the graph 92, 94 of FIG. 3, which is the same as the slope of the graph of the voltage $U_3$. If the voltage divider pair 15, 16 is built entirely of ohmic resistances and semiconductor elements having diode characteristics, which is readily realized by utilizing integrated circuits, then theoretically a maximum intersecting angle of $\alpha=45°$ can be obtained so long as the voltage divider pair is not loaded by any additional network elements. In actual, practical working, the angle of intersection is, however, small. The requirements regarding temperature stability further decrease this angle.

Referring now to FIG. 4: The branch between junctions 85 and 86, as well as the branch between junctions 82 and 84, just as in the example of FIG. 2, have a voltage reference element 53, 63, respectively. As effective additional resistances between junctions 81 and 82, resistances 54, 56 and 61, respectively, are provided. The further network elements are useful to increase the angle $\alpha$ at predetermined temperature coefficients of the entire network. The connection of the voltage dividers is, of course, that of a bridge, with the common end points being defined by terminals 81, 85, connected to bus 29 and 84, 88 connected to chassis bus 20, respectively, with the cross connecting terminals being tap points 82, 86 of the voltage dividers.

The circuit examples identified a to d illustrate various embodiments for the branch 16. Branch 116, FIG. 4, example a, utilizes three diodes 163, 165, 166 and three ohmic resistances 161, 162, 164. The example illustrated at b, that is voltage divider 216, utilizes three diodes 262, 263, 264 and two ohmic resistances 261 and 265. The example under c, voltage divider 316, utilizes four diodes 362 to 365 and one ohmic resistance 361, and the example d, voltage divider 416, utilizes two diodes 463, 464, connected in conductive direction and a breakdown diode 462 connected in blocking direction, together with an ohmic resistance 461. As can be seen, the section of the voltage divider (forming a branch of the complete bridge network) between terminals 81 and 82 is always ohmic, whereas the section between terminal 82 and terminal 84 is voltage dependent.

The examples e, f, and g of FIG. 4 illustrate three different arrangements for the voltage divider 15. Voltage divider 115, example e, illustrates five resistances 151 to 157, a filter condenser 155 and a Zener diode connected in blocking direction. Example f, voltage divider 215, uses four resistances 251 to 256, a Zener diode 253 connected in blocking direction and a filter condenser 255. Example g, voltage divider 315, uses two resistances 354, 356, a diode 351 connected in conductive direction and a Zener diode 353 connected in blocking direction. As seen, the circuits of all three examples e, f, g use sections between terminals 86, 87, and 88 which are pure ohmic resistances; the sections between terminals 85 and 86, however, utilize voltage-dependent resistance elements, that is include a Zener diode. Filter condenser 155 and 255, respectively, is connected between terminal 88 and a point on the resistance network between the terminals 85 and 86. Optimum filtering is obtained thereby without interfering with the effect of the cross coupling feedback resistance 72. Only a small filter condenser is necessary, which is particularly desired when the circuits are made as an integrated circuit. If the voltage of a direct current generator is to be controlled, the filter condenser may be omitted.

Particularly desirable arrangements can be obtained by utilizing the present invention, considering the following basic facts: It is important to symmetrically load the differential amplifier 43, 44, 46, 47 so that no distortion of the output transfer characteristic will result. If the input of semiconductor switch 41, 42 is directly connected to the outputs of the differential amplifier 43, 44, such unsymmetrical loading may result. The transistors differential amplifier is therefore so arranged that the inputs to the transistors 46, 47 are symmetrically coupled to the two outputs of the transistors 43, 44. The transistors 46, 47 thus have a push-pull input but only a single ended output. The push-pull stage, transistors 46, 47 is preferably formed of a pair of complementary transistors which provide for a particular simple network while retaining the advantages of symmetrically loading the input. The input resistances and the amplification of the differential input stage (transistors 43, 44) can be high, so that only small base and collector currents are necessary. The base of transistor 45 will receive a fixed potential from reference diode 63, which acts as a constant current source.

Resistance 77 interconnecting the emitters of the complementary transistors 46, 47 is a feedback resistance which increases the stability of the entire voltage regulator. It, however, also influences the hysteresis, that is the lag between switchover of the transistors 41, 42 upon change from conduction to nonconduction. It is not strictly necessary. Resistance 76 limits the base current of driver transistor 42 to a permissible value. Resistances 76, 77 may be part of an integrated circuit and can preferably be formed as a connecting resistance with the associated transistors 46, 47. Resistance 78 is used to bring the base of driver transistor 42 to zero potential, when the driver transistor is nonconductive as well known.

The voltage regulator of the present invention has the advantage that the values of the collector-emitter quiescent potentials of the two transistors 46 and 47, which carry the base current for driver transistor 42, do not have an undesirable influence on the performance of the regulator network, so that, which is particularly important in integrated circuits, only a small number of network elements need be used.

The control network has a high amplification, due to the use of a two-stage differential amplifier as well as the. The gain is so high that the variation of the output voltage $U_L$ which causes turn-on and turn-on of the control transistor 41, from a nominal value, can be very small. The voltage regulator thus will completely control the output voltage within a very small tolerance limit, since only minor changes of the difference voltage $U_3$ will cause switchover. As is well known, differential amplifiers such as the circuit including transistors 43, 44 are almost independent, within a wide value, of the absolute value of the voltages $U_1$ and $U_2$, and responsive only to the difference between the voltages $U_1$ and $U_2$ (that is to $U_3$). As a result, the temperature dependence on control action is determined almost entirely by the characteristics of the voltage divider pair 15, 16. This voltage divider pair, in view of this lack of sensitivity of tee differential amplifier to absolute voltages, can be constructed in a simple manner. The filtering network formed of resistance 51 and condenser 55, connected in the voltage divider branch 15 acts to dampen voltage peaks which occur during the control cycles and which, due to the nonlinear characteristic of reference diode 53, would otherwise be transferred to the output voltage. No such filtering network is necessary in the other voltage divider branch 16, since reference diode 63 essentially suppresses any voltage peaks. Thus, only a single condenser is necessary. Zener diode 63 in branch 16 thus has a dual function: for one, it provides the reference voltage for the base of the constant current source including transistor 45, and additionally, together with resistance 62, it forms the reference source for the base of differential amplifier transistor 44. Resistance 62 bridges the potential difference caused by the base-collector voltage of transistor 45 and the base-emitter voltage of transistor 44.

Differential amplifier 43, 44, 46, 47 and the constant current source including transistor 45, and the voltage divider 15, 16 may be used to control also PNP semiconductor switches. The control of a PNP output transistor can be taken off at the collector of transistor 47.

The present invention thus provides a voltage regulator which is particularly suitable to be built as an integrated circuit. Voltage divider branches 15, 16 can be constructed of simple network elements while being substantially immune to variation in temperature and output voltage. The particular form of amplifier 19 prevents damage to the voltage regulator due to overvoltages at the buses 20, 29 or due to excess voltage peaks as a result of spurious oscillations. The voltage regulator can be constructed with only a small number of standard electrical circuit elements, as well as in the form of integrated circuits especially monolithic integrated circuits.

I claim:

1. Voltage regulator for automotive type generators with an excited field winding, having a switching type controllable semiconductor element (41) adapted for connection in series with a field winding (24) of the generator (11) to control the output voltage ($U_L$) thereof, comprising
   a pair of voltage dividers (15, 16), at least one including nonlinear voltage sensitive means (53, 63), connected across the output of the generator (20, 29), said voltage dividers having tap points across which an error signal appears upon deviation of the output voltage from a predetermined value selected by reference to said voltage sensitive means;
   a differential amplifier (14; 44, 43, 46, 47) having a separate differential inputs, one each connected to a tap point (82, 86) of said voltage dividers, and a single output responsive to said error signal;
   means (17, 42) connecting the single output of said differential amplifier to said controllable semiconductor element to control the conduction thereof in accordance with said error signal appearing at the separate inputs of said differential amplifier and thus controlling current flow through the field of the generator;
   and a positive feedback circuit interconnecting the output of said differential amplifier and one of the inputs thereof whereby, upon deviation of output voltage from said predetermined value causing said error signal, the feedback circuit will cause rapid switching of the conductive state of said controllable semiconductor element.

2. Voltage regulator according to claim 1, wherein said differential amplifier includes a pair of transistors (43, 44) having similar electrodes connected together;
   and a constant current source (45) is provided supplying said similar electrodes of said transistors, and the control electrode of the constant current source being connected to a tap point (83) on a voltage divider including the voltage sensitive means.

3. Voltage regulator according to claim 2, wherein said voltage-sensitive means comprises a Zener diode, said Zener diode providing a reference voltage for one input to said differential amplifier and simultaneously for said constant current source.

4. Voltage regulator according to claim 1, wherein the differential amplifier is a two-stage amplifier and the output stage thereof includes a pair of complementary transistors.

5. Voltage regulator according to claim 1 wherein said differential amplifier includes a pair of transistors (43, 44) having their similar electrodes interconnected; and a constant current source (45) is provided supplying said interconnected similar electrodes.

6. Voltage regulator according to claim 1 including a feedback resistance (72) interconnecting the controlled semiconductor element and said voltage divider.

7. Voltage regulator according to claim 1, wherein the differential amplifier (43, 44, 46, 47) is a two-stage amplifier having a pair of input transistors (43, 44) and a pair of push-pull input, single ended output transistors (46, 47), having their push-pull inputs symmetrically separated coupled to the outputs of the input transistors (43, 44) to provide symmetrical loading of the input of the differential amplifier with respect to said pair of voltage dividers.

8. Voltage regulator according to claim 1, wherein said differential amplifier includes a pair of transistors (43, 44) having similar electrodes interconnected;
   and a constant current source (45) is provided supplying said interconnected similar electrodes.

9. Voltage regulator according to claim 1, wherein said voltage sensitive means comprises a voltage sensitive resistance in one of said voltage dividers;
   a constant current source is provided supplying said differential amplifier;
   and means connecting said voltage sensitive device to control the constant current source and to provide a sensing potential for one input of the differential amplifier.

10. Transistorized voltage regulator for automotive alternators having a field winding comprising
    a control switching transistor adapted for connection in series with the field winding;
    a differential amplifier having at least one pair of interconnected semiconductor switching elements and having a separate input and a single ended output controlling the conduction of said switching transistor.
    a bridge network having a pair of branches, the common connections being adapted for connection across the output voltage of said generator and each of the cross connection points of the bridge being connected to one each of the respective inputs of the differential amplifier;
    means included in each branch of the bridge network forming a voltage reference, said means being connected to opposite connections of said bridge whereby departure from desired output voltage will provide an error potential to the inputs of the differential amplifier at the cross connection;
    and a feedback circuit from the output of the differential amplifier to one of the inputs thereof.

11. Regulator according to claim 10, including an additional tap point on one of said branches of the bridge network;

and a feedback impedance connected from the output of the differential amplifier to the tap point to form said feedback circuit.

12. Regulator according to claim 10, including a constant current source having its output connected to the current supply for the differential amplifier and its input connected to the tap point of one of said branches and in circuit with said voltage reference means.

13. Regulator according to claim 10, wherein at least one branch of the bridge network includes a temperature-sensitive resistance connected between a common connection and a cross connection.

14. Regulator according to claim 10, wherein the differential amplifier, the bridge network, and accessory circuit components and network resistances are included in a single monolithic integrated circuit.

15. Regulator according to claim 10, wherein the differential amplifier includes a symmetrical two transistor push-pull circuit having a single ended output, and a pair of input transistors, each having said separate input and a separate output, each symmetrically connected to a respective one of the push-pull transistors;

and interconnections from said single ended output of the push-pull connected transistors to the switching transistor for said field winding.